US008435337B2

(12) United States Patent
Lee et al.

(10) Patent No.: US 8,435,337 B2
(45) Date of Patent: May 7, 2013

(54) VARIABLE INTAKE-TYPE AIR CLEANER

(75) Inventors: Seong-Hack Lee, Gyunggi-Do (KR); Jae-Hyeon Jung, Gyunggi-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/184,257

(22) Filed: Jul. 15, 2011

(65) Prior Publication Data

US 2012/0017764 A1 Jan. 26, 2012

(30) Foreign Application Priority Data

Jul. 20, 2010 (KR) ........................ 10-2010-0070160

(51) Int. Cl.
*B01D 46/00* (2006.01)

(52) U.S. Cl.
USPC ................ 96/397; 96/417; 55/385.3; 55/413; 55/414; 55/467; 55/503

(58) Field of Classification Search ................. 55/385.3, 55/331, DIG. 28; 123/198 E; 95/19, 22, 95/23; 96/397, 417; 138/37, 39, DIG. 4
See application file for complete search history.

(56) References Cited

U.S. PATENT DOCUMENTS

| | | | | |
|---|---|---|---|---|
| 6,423,118 | B1 * | 7/2002 | Becerra et al. | 95/19 |
| 7,171,986 | B2 * | 2/2007 | Canova et al. | 138/37 |
| 7,857,881 | B2 * | 12/2010 | Sato et al. | 55/385.3 |
| 8,137,424 | B2 * | 3/2012 | Ohzono | 55/385.3 |
| 2005/0247034 | A1 * | 11/2005 | Canova et al. | 55/385.3 |

FOREIGN PATENT DOCUMENTS

| | | | |
|---|---|---|---|
| JP | 2005-76619 | A | 3/2005 |
| JP | 2008-223595 | A | 9/2008 |
| KR | 10-2009-0058382 | A | 6/2009 |

* cited by examiner

*Primary Examiner* — Duane Smith
*Assistant Examiner* — Minh-Chau Pham
(74) *Attorney, Agent, or Firm* — Morgan, Lewis & Bockius LLP

(57) ABSTRACT

An air cleaner that filters air supplied into an engine may include a lower case that has an intake port through which external air flows inside, a filter that may be disposed in the lower case and filters and allows the air flowing inside through the intake port, and an upper case that may be coupled to an upper portion of the lower case and has an exhaust pipe to discharge the air filtered by the filter to the engine, wherein an inlet of the exhaust pipe may be formed inside the upper case and an outlet may be formed to be connected to the outside of the upper case, the inlet of the exhaust pipe may be divided into a first inlet and a second inlet, and a fan that controls the exhaust amount of air to the outlet of the exhaust pipe may be disposed in the second inlet.

1 Claim, 3 Drawing Sheets

VARIABLE INTAKE-TYPE AIR CLEANER

CROSS-REFERENCE TO RELATED APPLICATIONS

The present application claims priority to Korean Patent Application No. 10-2010-70160, filed on Jul. 20, 2010, the entire contents of which is incorporated herein for all purposes by this reference.

BACKGROUND OF THE INVENTION

1. Field of the Invention

The present invention relates to an air cleaner for a vehicle, and more particularly, to a variable intake-type air cleaner that can actively control intake pressure performance in accordance with the RPM of an engine.

2. Description of Related Art

When foreign substances flow into the air that flows into an engine, they may cause problems, such as generating smoke and decreasing output, in addition to an engine trouble.

Therefore, the air flowing into the engine is allowed to flow inside after being filtered through an air cleaner. The air cleaner is equipped with a built-in filter and supplies purified air into the engine after filtering fine particles and foreign substances contained in the atmosphere.

Meanwhile, the structure of an air cleaner of the related art is shown in FIG. 1. An upper case 1 and a lower case 3 are combined such that air passes in one direction and a filter 5 that filters the air is disposed therein.

That is, an intake port 4 through which external air flows inside is formed at the lower case 3 and an exhaust port 2 through which the air filtered by the filter 5 is discharged is formed at the upper case 1.

Meanwhile, the engine of a vehicle is an internal combustion engine and the amount of air required for the engine depends on the RPM (Revolution Per Minute) of the engine. That is, a relatively small amount of air is required at a low RPM, but more amount of air is required at a high RPM.

However, flow resistance is generated while the air that is supplied to the engine flows not only the air cleaner, but an air hose connecting the air cleaner with a carburetor of the engine, such that loss of engine output may be caused, when the amount of air required for the engine is not sufficiently supplied.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an air cleaner for a vehicle that allows air, which is supplied to an engine, to be smoothly supplied against flow resistance, and can supply air that is fit for the required amount that depends on the RPM of the engine.

In an aspect of the present invention, an air cleaner that filters air supplied into an engine may include a lower case that may have an intake port through which external air flows inside, a filter that may be disposed in the lower case and filters and allows the air flowing inside through the intake port, and an upper case that may be coupled to an upper portion of the lower case and may have an exhaust pipe to discharge the air filtered by the filter to the engine, wherein an inlet of the exhaust pipe may be formed inside the upper case and an outlet may be formed to be connected to the outside of the upper case, the inlet of the exhaust pipe may be divided into a first inlet and a second inlet, and a fan that controls the exhaust amount of air to the outlet of the exhaust pipe may be disposed in the second inlet.

The engine may be controlled by communicating with an electronic control unit and the electronic control unit operates the fan by determining the amount of air required in accordance with the rotation speed of the engine.

the first inlet and the second inlet may be disposed above the filter and fluid-communicate with the intake port through the filter wherein the intake port may be disposed below the filter.

According to exemplary embodiments of the present invention having the above-mentioned configuration, it is possible to prevent loss of engine output by preventing a nose at a low RPM and supplying sufficient air to the engine at a high RPM.

Further, since it is possible to supply a variable amount of air, it is possible to increase combustion efficiency of the engine and more effectively control the RPM of the engine.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
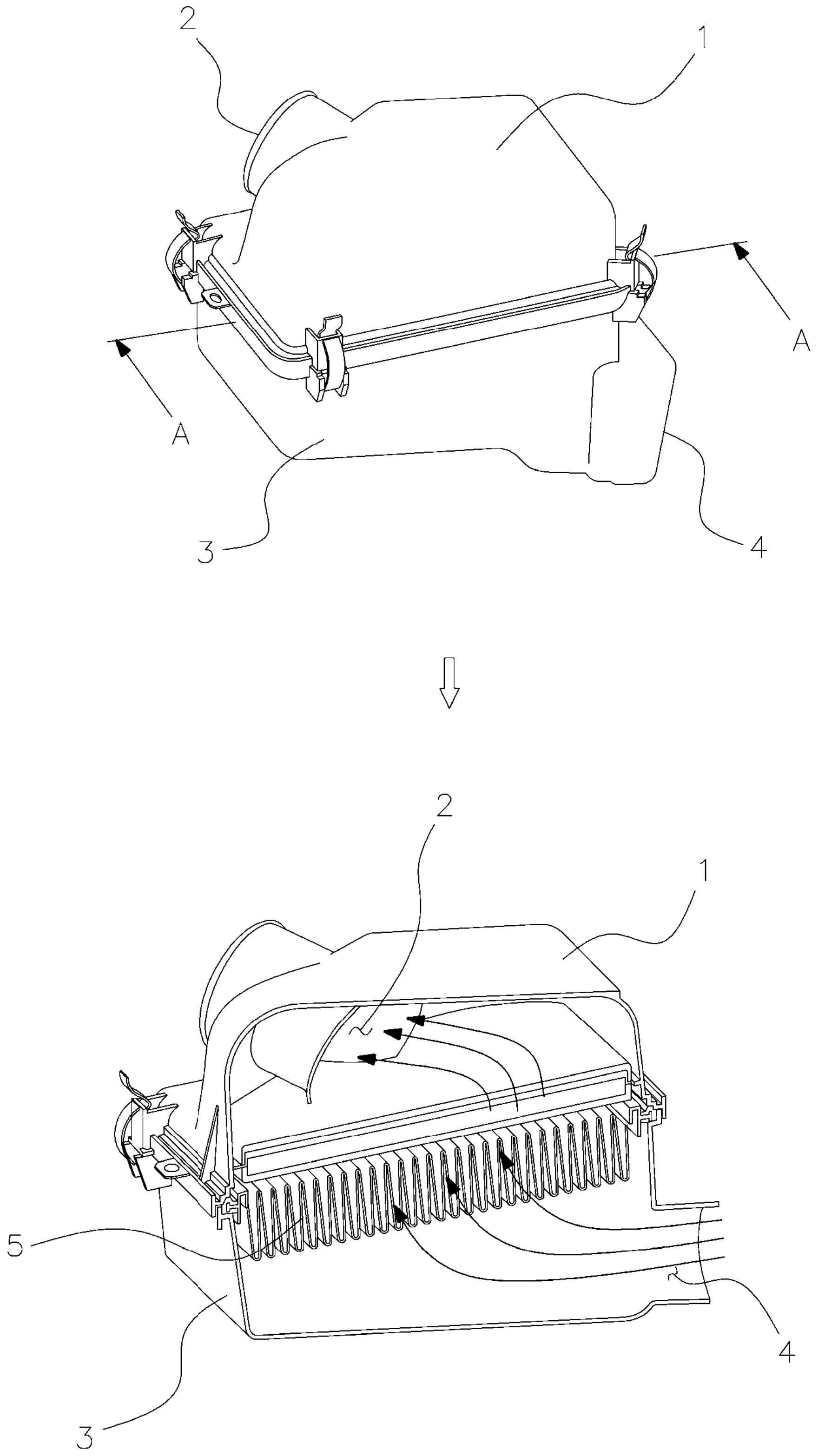
FIG. 1 is a perspective view and a cross-sectional view taken along the line A-A, of an air cleaner of the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An air cleaner according to an exemplary embodiment of the present invention is disposed in an engine room and connected to an air hose to supply air into an engine. Further, a built-in fan is rotated by a motor and the motor is electrically controlled by an electronic control unit (ECU).

Hereinafter, an air cleaner according to the exemplary embodiment of the present invention is described with reference to the accompanying drawings.

Figure 2:
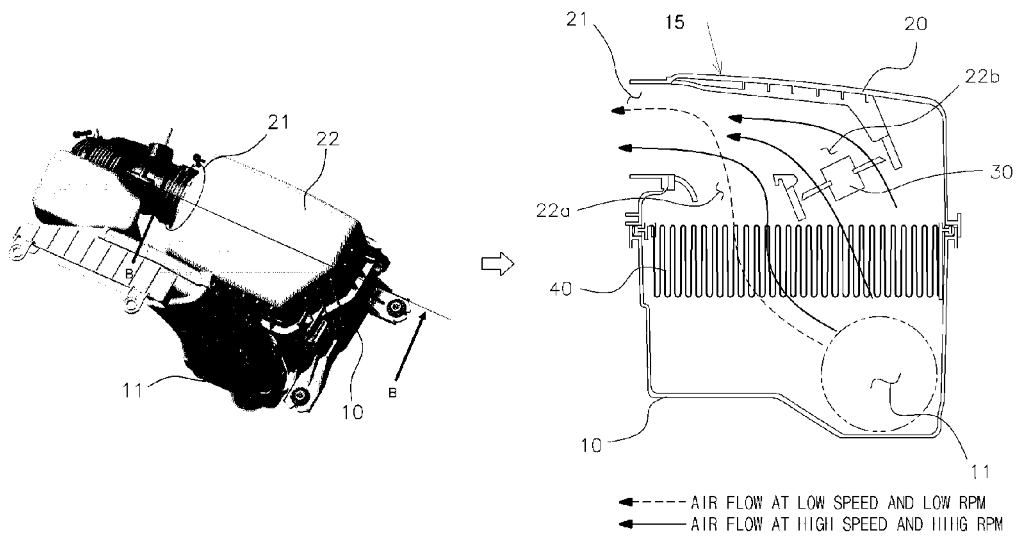
FIG. 2 is a cross-sectional view taken along the line B-B of an air cleaner according to an exemplary embodiment of the present invention.
Figure 3:
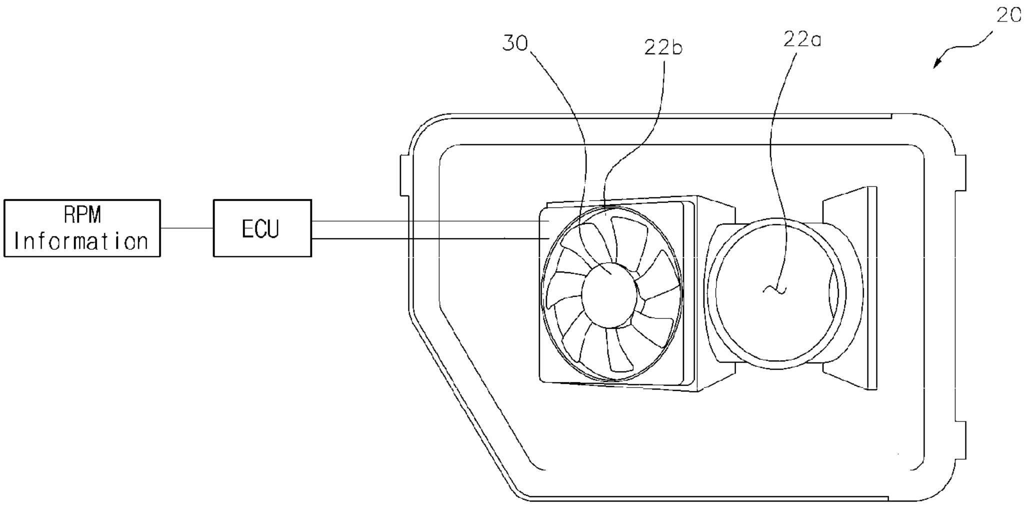
FIG. 3 is a bottom view of an upper case of the air cleaner according to an exemplary embodiment of the present invention.

Referring to FIGS. 2 and 3, an air cleaner of the present invention includes a case with a built-in filter that filters air and the case includes a lower case 10 having an intake port 11 that is formed at one side of the lower end and through which external air flows inside and an upper case 20 having an exhaust pipe 15 that is coupled to the upper portion of the lower case 11 and discharges the air filtered by the filter 40 into the engine.

The upper case 20 and the lower case 10 may be integrally formed, but they are formed such that the filter 40 that filters air can be replaced between the lower case 10 and the upper case 20.

Meanwhile, the exhaust pipe 15 of the upper case 20 is formed with an exhaust port 21 connected to the outside and coupled to the air hose connected to the engine, and with inlets 22*a* and 22*b* divided into two parts above the filter 40. That is, the inlet of the exhaust pipe 15 is divided into the first inlet 22*a* and the second inlet 22*b*, which join and are connected to an outlet of the exhaust pipe 15.

The first inlet 22*a* directly communicates with the outlet of the exhaust pipe 15, while a fan 30 is additionally disposed in the second inlet 22*b*. The fan 30 is rotated by a motor such that air is discharged to the exhaust port 21. The outlet of the exhaust pipe 15 is connected to the exhaust port 21.

The motor is controlled by electric signals from the ECU that controls the engine. The ECU calculates the optimum amount of air and controls the rotation of the fan 30 in real time on the basis of RPM information of the engine and information inputted from various sensors.

Therefore, the required amount of air is not large for a relative low RPM, such that it is possible to prevent a noise from being generated, by not rotating the fan or rotating the fan at a low speed, and decrease in engine output is prevented by sufficiently supplying the amount of air required for the engine by rotating the fan at a high speed for a high RPM.

That is, as shown in the cross-sectional view at the right side of FIG. 2, when the engine operates at a low RPM, most air that has been filtered by the filter 40 is (blocked by the fan that does not rotate) discharged through the first inlet 22*a* at a low speed, whereas when the engine operates at a high RPM, the air is discharged through the first inlet 22*a* or the second outlet 22*b*.

Therefore, since it is possible to control exhaust and flow speed of the air by controlling the rotation speed of the fan 30, it is possible to increase combustion efficiency of the engine and effectively control the engine output by variably controlling the rotation of the fan by stages in accordance with the RPM of the engine.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An air cleaner that filters air supplied into an engine, comprising:

a lower case that has an intake port through which external air flows inside;

a filter that is disposed in the lower case and filters and allows the air flowing inside through the intake port; and an upper case that is coupled to an upper portion of the lower case and has an exhaust pipe to discharge the air filtered by the filter to the engine, wherein an inlet of the exhaust pipe is formed inside the upper case and an outlet is formed to be connected to the outside of the upper case, the inlet of the exhaust pipe is bifurcated into a first inlet and a second inlet, and a fan that controls the exhaust amount of air to the outlet of the exhaust pipe is disposed in the second inlet, wherein the engine is controlled by communicating with an electronic control unit and the electronic control unit operates the fan by determining the amount of air required in accordance with the rotation speed of the engine, wherein the first inlet and the second inlet are disposed above the filter and fluid-communicate with the intake port through the filter, and wherein the intake port is disposed below the filter.

* * * * *